(No Model.) 2 Sheets—Sheet 1.
W. H. NORTON.
POISON DISTRIBUTER.
No. 572,907. Patented Dec. 8, 1896.
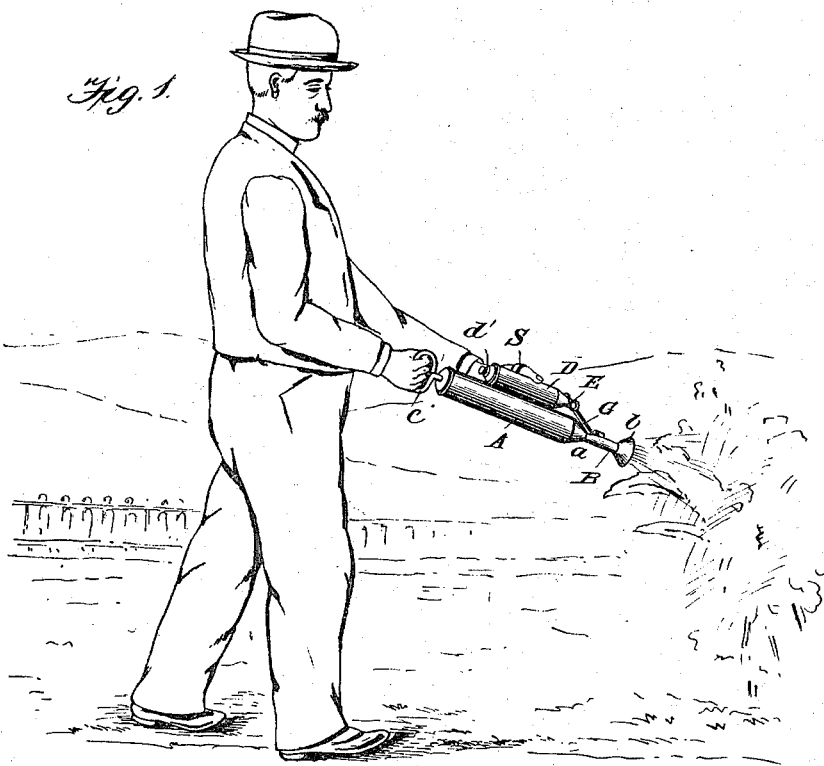
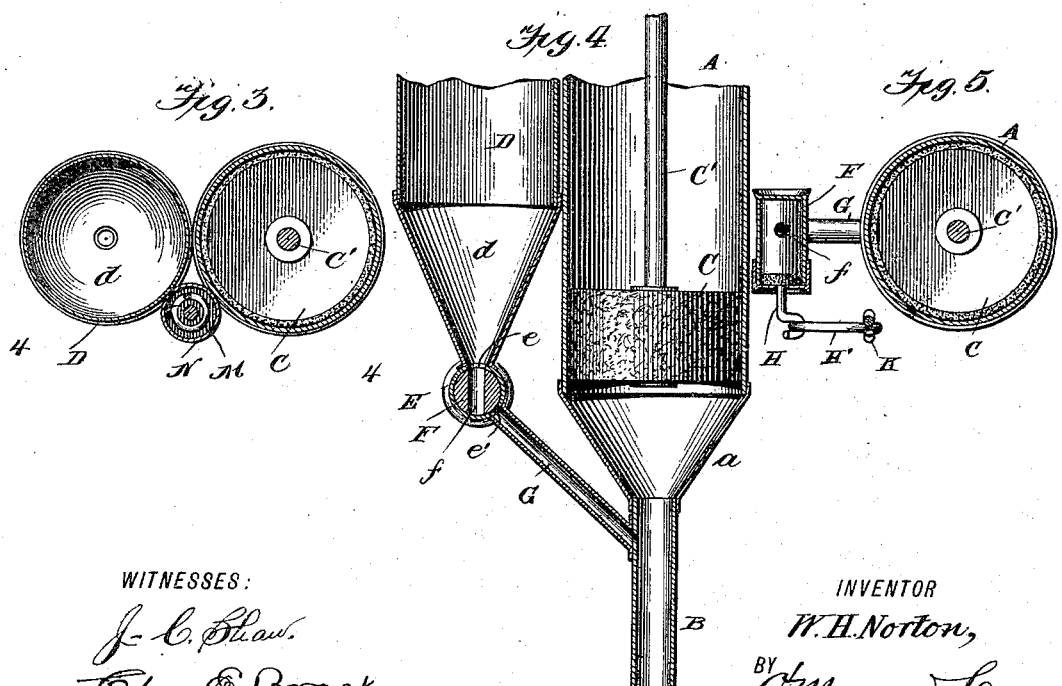
WITNESSES:
J. C. Shaw.
Chas. E. Brock
INVENTOR
W. H. Norton,
BY O'Meara & Co
ATTORNEYS (No Model.) 2 Sheets—Sheet 2.
W. H. NORTON.
POISON DISTRIBUTER.
No. 572,907. Patented Dec. 8, 1896.
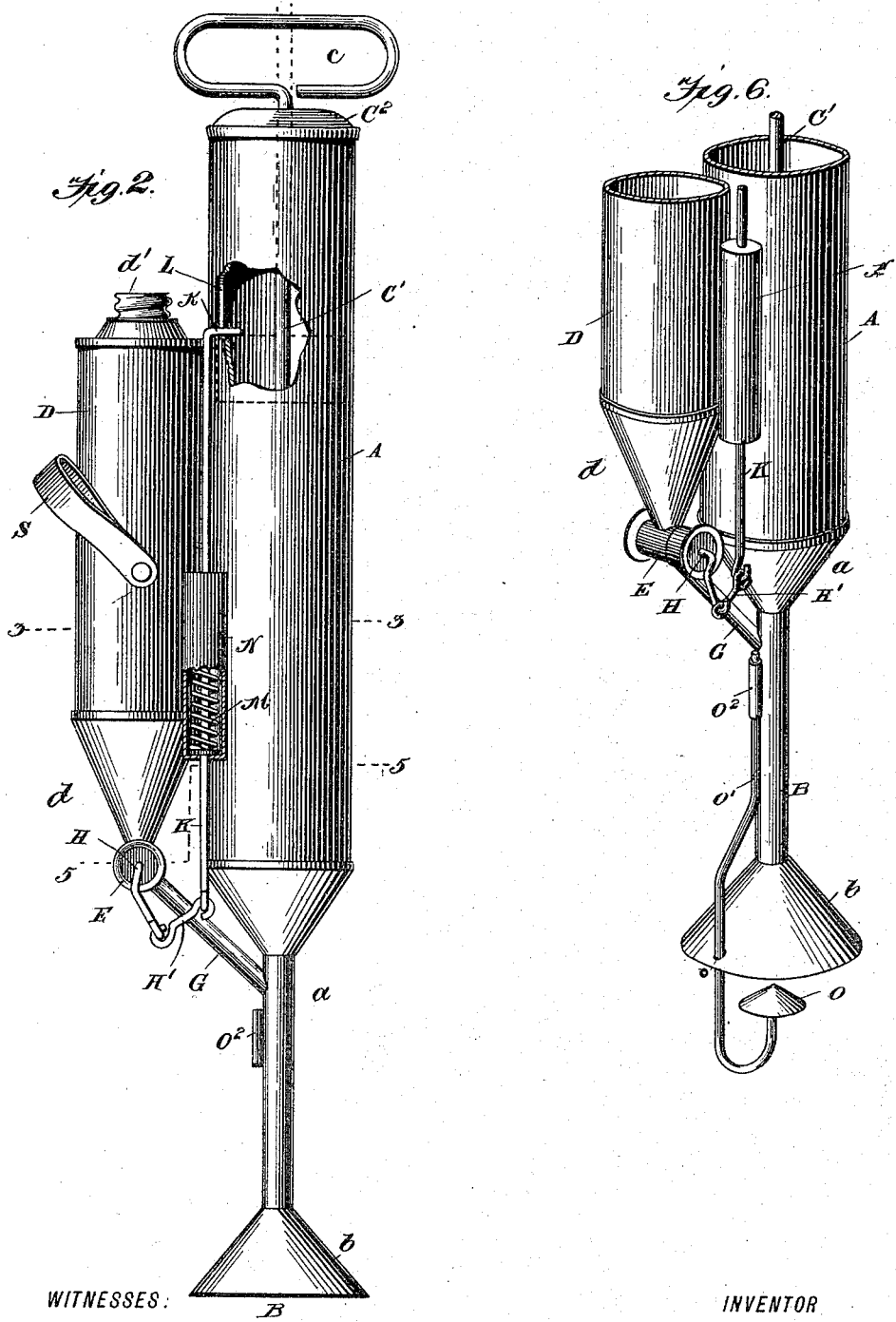
WITNESSES:
J. C. Shaw
Chas. E. Brock
INVENTOR
W. H. Norton,
BY
O'Meara & Co.
ATTORNEYS

UNITED STATES PATENT OFFICE.

WILLIAM H. NORTON, OF MEXICO, NEW YORK.

POISON-DISTRIBUTER.

SPECIFICATION forming part of Letters Patent No. 572,907, dated December 8, 1896.

Application filed February 27, 1896. Serial No. 580,932. (No model.)

*To all whom it may concern:*

Be it known that I, WILLIAM H. NORTON, residing at Mexico, in the county of Oswego and State of New York, have invented a new and Improved Poison-Distributer, of which the following is a specification.

This invention is an improved insect-destroyer or poison-distributer for spraying a powder, such as paris-green, upon potato and similar vines for the purpose of destroying bugs, worms, &c.

The object of the invention is to provide a cheap and simple form of distributer which can be conveniently carried about and easily operated; and another object is to provide a distributer which will spray a uniform amount of powder at each operation, and will prevent the escape of the powder when the device is being carried about but not in operation.

Another object is to provide a distributer which will spread or spray the powder over a great area, thus doing a maximum amount of good.

With these objects in view my invention consists, essentially, in the employment of a powder-chamber, an air-cylinder and piston, a discharge-spout, and means for conveying the powder into the discharge-spout at each action of the piston, whereby a uniform amount of powder will be blown upon the plants at each operation.

The invention consists also in providing a spraying attachment upon the discharge-spout to spread the powder over a greater area.

The invention consists also in certain details of construction and novelties of combination, all of which are shown in the drawings, set forth in the description, and particularly pointed out in the claims.

In the drawings forming a part of this specification, Figure 1 is a view showing my invention as in use. Fig. 2 is a side elevation, partly in section. Fig. 3 is a transverse section on line 3 3 of Fig. 2. Fig. 4 is a vertical section on line 4 4 of Fig. 3. Fig. 5 is a horizontal section on line 5 5 of Fig. 2. Fig. 6 is a detail view showing the spraying attachment in use.

In constructing a poison-distributer in accordance with my invention I employ an air-cylinder A, which is contracted at its forward end $a$ and provided with a discharge-spout B, having a flared mouth $b$.

A piston C is worked in the cylinder A by means of a rod C', passing through a cap $C^2$, secured in rear end of cylinder, the free end of rod being bent or formed with a suitable handle $c$.

A powder-chamber D is arranged above the air-cylinder A, said chamber being preferably cylindrical in shape and contracted at the forward end, as at $d$, and provided with a screw-cap $d'$ at the rear end, said cap being removed for the purpose of filling the chamber with paris-green or similar powdered poison.

At the forward end of the powder-chamber is arranged a valve-case E, cylindrical in form, and in which turns a rotary valve F, the valve-case having an inlet-opening $e$, which admits the powder from the chamber D, and an outlet-opening $e'$, which communicates with a discharge-tube G, leading into the discharge-spout B.

The rotary valve F has a transverse bore $f$, which is first brought into register with the opening $e$ to receive a charge and then moved into register with the opening $e'$ to discharge into the tube G, whereby a definite amount of powder is let into the discharge-spout and then blown therefrom by the forward movement of the piston, and as the spout has a flared mouth the powder will be effectually sprayed.

In order to operate the valve at each movement of the piston, I provide the valve with a shaft H, which is cranked or bent at a right angle, the end of such shaft being connected by a link H' with a rod K, the rear end of such rod being bent down, as at $k$, and passed through a slot L, cut in the side of air-cylinder at a point to the rear of the piston, so that when the piston is drawn back the head of piston strikes the end $k$ and draws the rod K rearward, rotating the valve to discharge into the tube G.

Upon the forward movement of the piston the powder is blown out and the rod K is thrown forward by means of a coiled spring M, which surrounds said rod inside of a suitable tubular guide N, said spring being compressed when the rod is drawn back, and the moment the piston moves forward the spring will throw the rod forward, moving the valve back to receive another charge of powder.

A strap-loop S is preferably secured to the side of powder-chamber, by means of which the device can be conveniently held in the left hand while the piston is moved back and forth by the right hand.

In operation the powder-chamber is filled with poison-powder and carried along by hand beside the potato or other vines. This powder is sprayed upon said plants or vines by simply working the piston back and forth, such action not only forcing powder out, but also opening and closing the valve in proper order to discharge a definite amount of powder into the discharge-spout prior to each forward movement of the piston.

When it is desired to spray the powder over a particularly large area, I employ a spraying attachment which consists in a conical-shaped body O, supported in advance of the mouth $b$ by means of a wire O', which is bent upward and passed through an opening $o$, made near the top of said flaring mouth, and is then bent downward to fit a guide O², arranged upon the discharge-spout.

In operating with this attachment the powder strikes the point of body O and is deflected outward over a much greater area than if the attachment were not used.

Having thus described my invention, what I claim, and desire to secure by Letters Patent, is—

1. In a poison-distributer, the combination with an air-cylinder and piston, of a powder-chamber and valve, the valve-shaft and operating-rod, said rod being operated by the rear movement of the piston and a spring for throwing the rod forward substantially as shown and described.

2. In a poison-distributer, the combination with an air-cylinder having a discharge-spout of a piston working therein, a powder-chamber, a discharge-tube, a rotary cut-off valve and the rod and link and spring for operating said valve, the rear end of said rod contacting with the piston upon the rear stroke substantially as shown and described.

3. In a poison-distributer, the combination with an air-cylinder, having a discharge-spout, of a piston working in said cylinder, a powder-chamber, the valve-case, valve and discharge-tube, the cranked valve-shaft the link and rod, said rod having a hooked rear end projecting into the air-cylinder, and a coiled spring surrounding said rod substantially as and for the purposes described.

4. The combination with a discharge-spout, of a guide, the conical body held in front of discharge-spout and the wire attached thereto and adapted to fit in the guide on spout substantially as shown and described.

WILLIAM H. NORTON.

Witnesses:
NORVAL D. HART,
CHALMER J. LONGSTREET.